(12) United States Patent
Kawahara

(10) Patent No.: US 8,078,044 B2
(45) Date of Patent: Dec. 13, 2011

(54) IMAGE STABILIZATION APPARATUS, IMAGE SENSING APPARATUS AND IMAGE STABILIZATION METHOD

(75) Inventor: Hideo Kawahara, Hatogaya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/828,605

(22) Filed: Jul. 1, 2010

(65) Prior Publication Data

US 2011/0013896 A1 Jan. 20, 2011

(30) Foreign Application Priority Data

Jul. 15, 2009 (JP) .................... 2009-167271

(51) Int. Cl.
*G03B 17/00* (2006.01)
(52) U.S. Cl. ............................................... 396/55
(58) Field of Classification Search .......... 396/52, 396/53, 55; 348/208.99, 208.2–208.4, 208.12, 348/208.16
See application file for complete search history.

(56) References Cited

U.S. PATENT DOCUMENTS 5,845,156 A 12/1998 Onuki
7,929,848 B2 * 4/2011 Taguchi ................ 396/55

FOREIGN PATENT DOCUMENTS

JP 3162126 4/2001

* cited by examiner

*Primary Examiner* — W. B. Perkey
*Assistant Examiner* — Minh Phan
(74) *Attorney, Agent, or Firm* — Cowan, Liebowitz & Latman, P.C.

(57) ABSTRACT

An image stabilization apparatus comprises a detection unit that detects camera shake in first and second directions orthogonal to each other, first and second filter units that cut off a low frequency component of an output from the detection unit, a calculation unit that calculates correction amounts for correcting camera shake in the first and second directions based on outputs from the first and second filter units, a control unit that controls cutoff frequencies of the first and second filter units based on the first and second correction amounts, wherein the larger the correction amount the higher the cutoff frequency, a determination unit that determines whether the first and second correction amounts exceed predetermined values, and a correction unit that corrects camera shake based on the calculated correction amounts. The control unit controls the cutoff frequencies of the second/first filter units based on the first/second correction amounts in a case in which the first/second correction amounts exceed the predetermined values.

4 Claims, 5 Drawing Sheets

US 8,078,044 B2

IMAGE STABILIZATION APPARATUS, IMAGE SENSING APPARATUS AND IMAGE STABILIZATION METHOD

BACKGROUND OF THE INVENTION

1. Field of the Invention

The present invention relates to an image sensing apparatus and an image stabilization method, and more particularly, to a technology that achieves smooth image stabilization control in an image sensing apparatus that has an image stabilization function that optically corrects camera shake of an image sensing apparatus such as a camera.

2. Description of the Related Art

In optical correction algorithms for related-art optical image sensing apparatuses equipped with an optical image stabilization mechanism, there is a control method involving associating two correction axes. However, if each of the two orthogonal correction axes is allowed to acquire its correction maximum value, the lens barrel becomes unacceptably large and optical aberration occurs. To solve these problems, providing a control unit so that the optical camera shake correction maximum allowed driving range is controlled and controlling the movable range of the correction optical system has been proposed (as seen in, for example, Japanese Patent No. 3162126).

However, in the above-described related art example, in the movable range within the optical image stabilization correction maximum allowed driving range, although the two correction axes of the image stabilization optical system can be freely driven without limitation, once the correction maximum allowed driving range is achieved the image stabilization optical system movement stops. As a result, problems such as the following occur.

That is, depending on whether inside or outside the correction maximum allowed driving range, the region through which the image stabilization optical system can freely move and the region in which it stops are separate. As a result, although a sufficient suppression effect can be obtained in a case in which a camera shake amount is applied that is within the movable range up to the correction maximum allowed driving range, when a camera shake amount is applied that exceeds the correction maximum allowed driving range the image stabilization stops at the point at which the correction maximum allowed driving range is reached. As a result, image stabilization continuity is suddenly lost, leading to states (images) in which camera shake is corrected and states (images) in which camera shake is not corrected.

With video cameras in particular, which sense images continuously, from the viewpoint of image stability the viewer may be made to feel uncomfortable or even unpleasant if correction continuity is not maintained.

SUMMARY OF THE INVENTION

The present invention has been made in consideration of the above situation, and improves image stability in an image sensing apparatus.

According to the present invention, provided is an image stabilization apparatus comprising: (a) a detection unit that detects camera shake in first and second directions orthogonal to each other; (b) a first filter unit and a second filter unit that cut off a low frequency component of an output from the detection unit, wherein cutoff frequencies of the first and second filter units are variable; (c) a calculation unit that calculates a correction amount for correcting camera shake in the first direction and a correction amount for correcting camera shake in the second direction based on outputs from the first and second filter units, respectively; (d) a control unit that controls the cutoff frequency of the first filter unit based on the first correction amount and the cutoff frequency of the second filter unit based on the second correction amount, wherein the larger the correction amount the higher the control unit sets the cutoff frequency; (e) a determination unit that determines whether the first and second correction amounts respectively exceed predetermined values set for the first and second correction amounts, respectively; and (f) a correction unit that corrects camera shake based on the correction amounts calculated for the first and second directions by the calculation unit, wherein the control unit controls the cutoff frequency of the second filter unit based on the first correction amount in a case in which it is determined by the determination unit that the first correction amount exceeds the predetermined value set for the first correction amount, and controls the cutoff frequency of the first filter unit based on the second correction amount in a case in which it is determined by the determination unit that the second correction amount exceeds the predetermined value set for he second correction amount.

Further, according to the present invention, provided is an image sensing apparatus comprising the image stabilization apparatus as described above.

Furthermore, provided is an image stabilization method comprising the steps of: (a) detecting camera shake in first and second directions orthogonal to each other; (b) cutting off a low frequency component of an output indicating a detection result of the detection step using a first filter unit and a second filter unit, wherein cutoff frequencies of the first and second filter units are variable; (c) calculating a correction amount for correcting camera shake in the first direction and a correction amount for correcting camera shake in the second direction based on outputs from the first and second filter units, respectively; (d) controlling the cutoff frequency of the first filter unit based on the first correction amount and the cutoff frequency of the second filter unit based on the second correction amount, wherein the larger the correction amount the higher the cutoff frequency; (e) determining whether the first and second correction amounts respectively exceed predetermined values set for the first and second correction amounts, respectively; and (f) correcting camera shake based on the correction amounts calculated for the first and second directions by the calculation unit, wherein the controlling step controls the cutoff frequency of the second filter unit based on the first correction amount in a case in which it is determined in the determination step that the first correction amount exceeds the predetermined value set for the first correction amount, and controls the cutoff frequency of the first filter unit based on the second correction amount in a case in which it is determined in the determination step that the second correction amount exceeds the predetermined value set for the second correction amount.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings.

Figure 1:
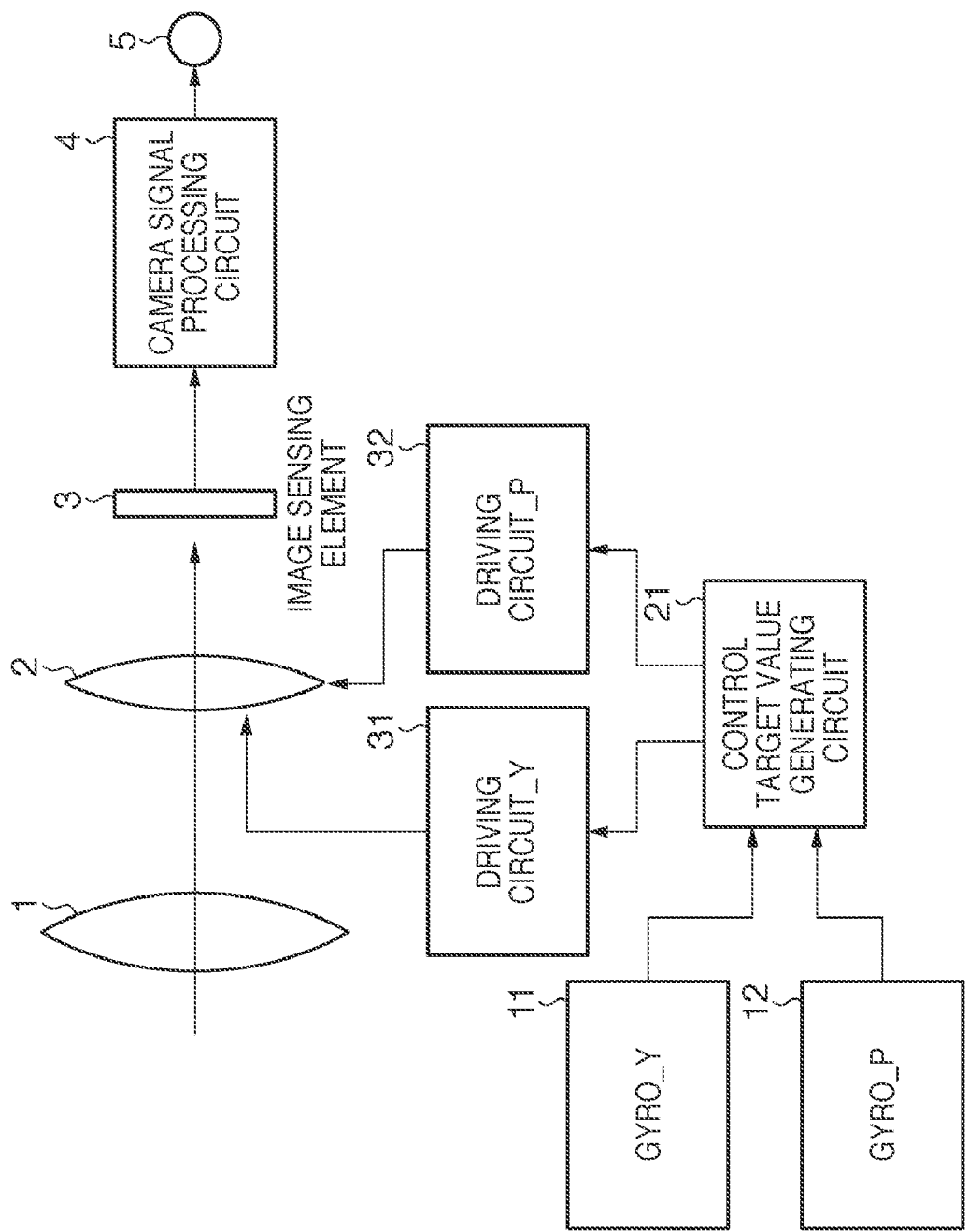
FIG. 1 is a block diagram showing a schematic configuration of an image sensing apparatus according to an embodiment of the present invention.

FIG. 1 is a block diagram showing a configuration of an image sensing apparatus according to an embodiment of the present invention. In FIG. 1, reference numeral 1 designates a lens group that is an image sensing optical system. Reference numeral 2 designates a camera shake correction optical system (optical member) that corrects blur in an image caused by camera shake which effects on an image and in the present embodiment is a correction lens movable in a direction orthogonal to the optical axis. Reference numeral 3 designates an image sensing element that photoelectrically converts an image formed by the lens group 1. It is to be noted that although in the present embodiment a description is given using a correction lens as the camera shake correction optical system 2 that corrects blur in an image caused by camera shake, the camera shake correction optical system may be constituted by the image sensing element 3 movable in a direction orthogonal to the optical axis. Reference numeral 4 designates a camera signal processing circuit that takes an image sensing signal photoelectrically converted by the image sensing element 3 and, for example, converts it into a standard signal such as a standard video signal or the like. Reference numeral 5 designates an output terminal that outputs the standard signal obtained by the camera signal processing circuit 4.

In addition, the image sensing apparatus of the present embodiment has the following configuration as the camera shake correction mechanism. That is, reference numerals 11 and 12 designate angular velocity sensors such as vibration gyros, each having different detection axes, for detecting camera shake applied to the camera. By arranging the detection axes of the angular velocity sensors 11 and 12 as detection axes orthogonal to each other on a plane that is itself orthogonal to the optical axis, it becomes possible to detect rotational camera shake (Yaw) in a lateral direction of the camera as well as rotational camera shake (Pitch) in a longitudinal direction of the camera. Hereinafter, the angular velocity sensor that detects camera shake in the yaw direction is called gyro_Y 11, and the angular velocity sensor that detects camera shake in the pitch direction is called gyro_P 12. Reference numeral 21 designates a control target value generating circuit that obtains a camera shake correction amount that is a driving amount of the camera shake correction optical system 2 based on the detection output of the gyro_Y 11 and the gyro_P 12.

Reference numerals 31 and 32 are driving circuits for driving the camera shake correction optical system 2 based on the camera shake correction amount obtained by the control target value generating circuit 21. Hereinafter, the driving circuit that carries out driving to correct camera shake in the direction of yaw (the lateral direction) is called the driving circuit_Y 31, and the driving circuit that carries out driving to correct camera shake in the direction of pitch (the longitudinal direction) is called the driving circuit_P 32. With this, camera shake correction of the same correction axes is carried out.

Figure 2:
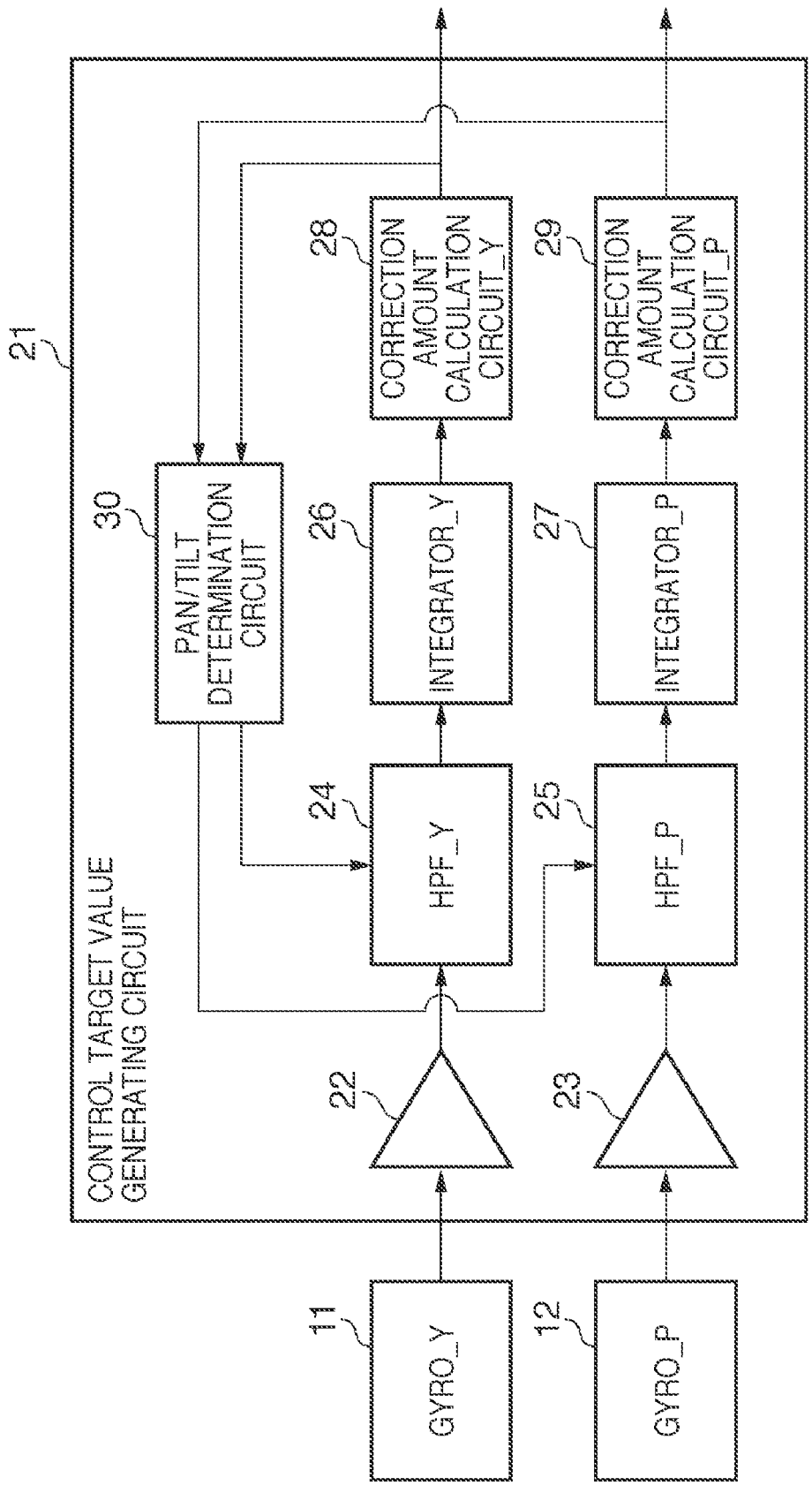
FIG. 2 is a block diagram showing a configuration of a control target value generating circuit.

Next, a description is given of the configuration and operation of the control target value generating circuit 21 using FIG. 2. It is to be noted that the same elements as shown in FIG. 1 are given the same reference numerals and a description thereof is omitted. In FIG. 2, reference numerals 22 and 23 designate amps, which amplify and output angular velocity signals output from the gyro_Y 11 and the gyro_P 12. Reference numerals 24 and 25 designate high pass filters (HPF), frequency characteristics of which can be varied by changing the cutoff frequency. The HPF 24 and 25 cut off low-frequency components included in the angular velocity signals amplified by the amps 22 and 23 and allow the remaining frequency components to pass through. Hereinafter, the HPF to which signals based on the output of the gyro_Y 11 are input is called HPF_Y 24 and the HPF to which signals based on the output of the gyro_P 12 are input is called HPF_P 25.

Reference numerals 26, 27 designate integrators that obtain angular displacement amounts by time-integrating the respective angular velocity signals output from HPF_Y 24 and HPF_P 25. Hereinafter, the integrator to which the output signal from HPF_Y 24 is input is called integrator_Y 26, and the integrator to which the output signal from HPF_P 25 is input is called integrator_P 27. Reference numerals 28 and 29 are correction amount calculation circuits, which convert the angular displacement amounts output by the integrator_Y 26 and the integrator_P 27 into a camera shake correction amount for driving the camera shake correction optical system 2 and output it. Hereinafter, the correction amount calculation circuit to which the output signal from the integrator_Y 26 is input is called the correction amount calculation circuit_Y 28, and the correction amount calculation circuit to which the output signal from the integrator_P 27 is input is called the correction amount calculation circuit_P 29.

The correction amount calculation circuit_Y 28 and the correction amount calculation circuit_P 29 are circuits that correct the relation between the optical camera shake correction angle (the amount of change in the optical axis) with respect to the correction movement amount of the camera shake correction optical system 2, and may, for example, be divider circuits that divide the optical camera shake correction angle with respect to the correction movement amount of the camera shake correction optical system 2. In addition, the correction amount calculation circuit_Y 28 and the correction amount calculation circuit_P 29 may be placed downstream of the integrator_Y 26 and the integrator_P 27 described in the present invention seen from the gyro_Y 11 and the gyro_P 12. Further, by changing the amplification rate of the amp 22 and the amp 23, the amp 22 and the amp 23 can also serve as the correction amount calculation circuit_Y 28 and the correction amount calculation circuit_P 29.

Reference numeral 30 designates a pan/tilt determination circuit, which determines whether or not the image sensing apparatus is in a panning or a tilting state based on the camera shake correction amount (hereinafter simply "correction amount") obtained by the correction amount calculation circuit_Y 28 and correction amount calculation circuit_P 29 and changes the frequency characteristics of the HPF_Y 24 and the HPF_P 25. Panning and tilting are carried out when a photographer deliberately changes the composition of a scene and shoots. Consequently, if movement of the camera during panning and tilting is corrected as camera shake, conversely it becomes difficult to shoot the scene that the photographer intends. Therefore, typically camera shake correction during panning and tilting is controlled so that correction for movement of the camera corresponding to panning and tilting is not carried out. During panning and tilting, because the image sensing apparatus moves in one direction continuously for a predetermined time period, pan/tilt control is carried out in the present embodiment by the HPF_Y 24 and the HPF_P 25 blocking low-frequency camera shake so that panning and tilting are not corrected as camera shake. A detailed description of this change in frequency characteristics is given later.

By the above-described operations a correction amount is generated, enabling optical camera shake correction by the correction optical system 2 through the driving circuit_Y 31 and the driving circuit_P 32 as described above.

Figure 3A:
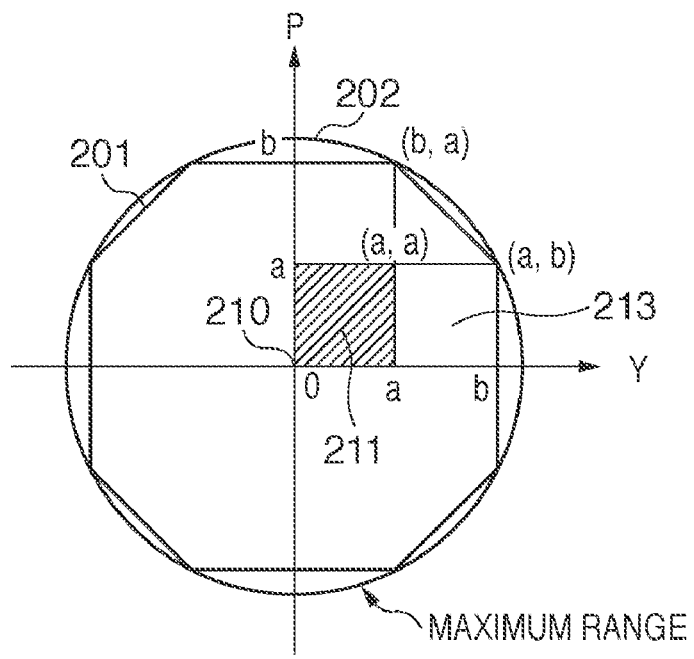
FIGS. 3A and 3B are diagrams showing a movable range of a correction optical system.
Figure 3B:
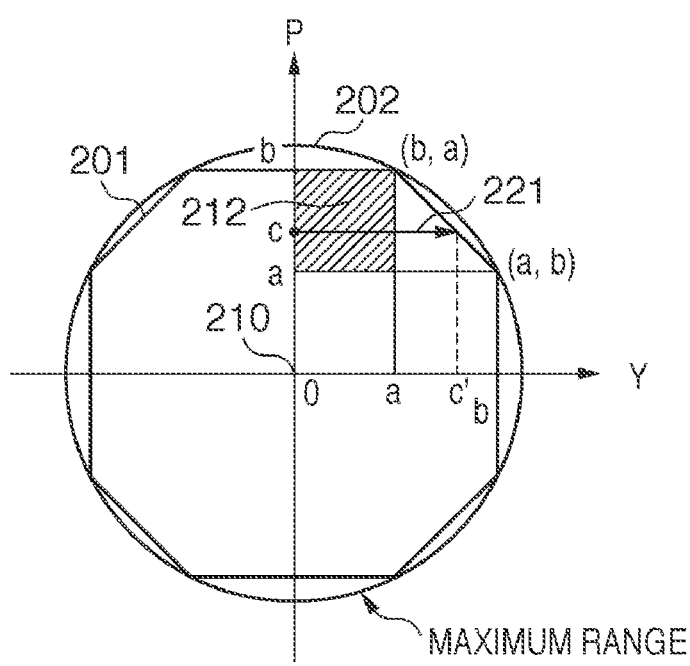
Figure 4:
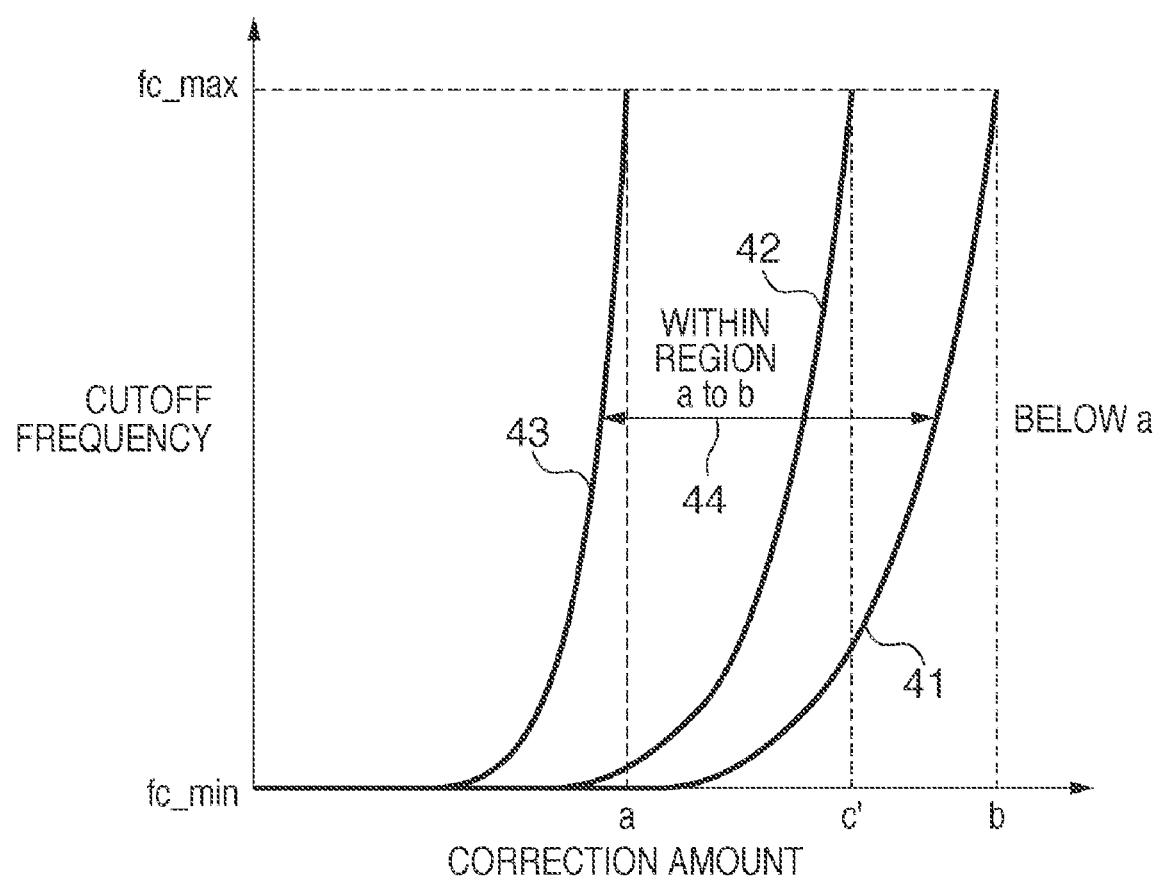
FIG. 4 is a graph showing a relation between correction amount and cutoff frequency according to the embodiment of the present invention.

Next, a description is given of pan/tilt control by the pan/tilt determination circuit 30, that is, the driving range of the correction optical system 2, including changes in the frequency characteristics of the HPF, using FIGS. 3A, 3B, and 4. In FIGS. 3A and 3B, the P axis is the correction axis that corrects camera shake in the detection direction of the gyro_P 12 (that is, longitudinally up and down), and the Y axis is the correction axis that corrects camera shake in the direct of detection of the gyro_Y 11 (that is, laterally left and right). In FIG. 3A and FIG. 3B, the movable range of the center of the correction optical system 2 is shown as a single flat plane composed of the P coordinates and the Y coordinates. In addition, FIG. 4 is a graph showing cutoff frequency of HPF_Y 24 and HPF_P 25 (vertical axis) plotted against angular displacement amount changed and controlled by the pan/tilt determination circuit 30 (horizontal axis).

In FIG. 3A and 3B, reference numeral 210 designates the movable center of the correction optical system 2, which matches the optical axis of the lens group 1. Reference numeral 202 designates the maximum range through which the center of the correction optical system 2 can be driven (the maximum correction range), which is a maximum range through which movement is restricted by a holding mechanism, not shown, that movably holds the correction optical system 2, and an optically effective light path. If the center of the correction optical system 2 is displaced beyond the maximum range 202 a correction control discontinuity due to mechanical limitations can arises and can cause failure of optical performance. Therefore, it is necessary to keep the center of the correction optical system 2 within the maximum range 202. In a case in which the center of the correction optical system 2 is at the movable center 210, the optical correction of the correction optical system 2 is 0. In a case in which the center of the correction optical system 2 is at the maximum range 202, the optical correction amount is at its maximum.

Referenced number 201 designates a correction control range in which the center of the correction optical system 2 can move in the present embodiment. It is formed by the pan/tilt control performed by the pan/tilt determination circuit 30 and provided within the maximum range 202. Although in the present invention the range is shown as an octagon, alternatively it may be a circle.

The correction optical system 2 is movable through a range on a single plane composed of the P coordinates and the Y coordinates, in conjunction with the camera shake correction operation described above.

In a movable range 211 of the correction optical system 2 shown in FIG. 3A, in which the correction amount of the P axis is a or less and the correction amount of the Y axis is a or less as shown in FIG. 3A (P=0 to a, Y=0 to a), the cutoff frequency of HPF_Y 24, HPF_P 25 is set at its lowest setting by the control performed by the pan/tilt determination circuit 30. By setting in this way, practically all of the angular velocity signals detected by the gyro_Y 11 and the gyro_P 12 pass through HPF_Y 24 and HPF_P 25. Then, correction amounts in the directions of the Y axis and the P axis based on the angular displacement amounts integrated and obtained by each of the integrator_Y 26 and the integrator_P 27. As a result, in the movable range 211 (P=0 to a, Y=0 to a) of the correction optical system 2 in which the correction amount of the P axis is a or less and the correction amount of the Y axis is a or less as shown in FIG. 3A, camera shake can be corrected without activating the panning control.

A description is now given of change in the cutoff frequency of HPF_Y 24 in a case in which, from this state, camera shake on the Y axis side exceeds the correction amount a and increases to a movable range 213 (P=0 to a, Y=a to b) of the correction optical system 2. In this case, the cutoff frequency is changed as shown in line 41. More specifically, in the movable range 211, in which the correction amount of the correction optical system 2 for both the Y axis and the P axis is a or less, the cutoff frequency of HPF_Y 24 and HPF_P 25 is set to a minimum value fc_min. When the correction amount of the correction optical system 2 exceeds a and increases, as shown in line 41 in FIG. 4 the cutoff frequency of HPF_Y 24 increases with the correction amount, providing a restriction on the pass-through frequencies on the Y axis side. By suppressing an increase in the camera shake correction amount on the Y axis side obtained from the control target value generating circuit 21 in this way, panning-time control is obtained. Here, in contemplation of a case in which camera shake increases and the correction optical system 2 exceeds the movable range 211 and reaches the movable range 213, the correction amount maximum value is (a, a) at the beginning. In a case in which the correction amount in the Y axis direction has increased from here, it reaches the maximum range 202 at (a, b). Accordingly, the correction amount maximum value is set at b. Then, at the Y axis side correction amount maximum value b, by setting the cutoff frequency at a maximum value fc_max that does not permit any of the frequencies of the camera shake applied to the camera to pass, control that does not exceed the correction amount b can be achieved.

Next, a case in which the correction amount of the correction optical system 2 on the P axis side has increased so as to correct camera shake applied to the camera is shown in FIG. 3B. In a correction optical system 2 movable range 212 (P=a to b, Y=0 to a), indicated by the P axis side correction amount exceeding a and the Y axis side correction amount at a or less, the cutoff frequency of HPF_P 25 is raised based on the P axis correction amount. As a result, a restriction is placed on the pass-through frequencies on the P axis side, and therefore an increase in the P axis side correction amount obtained from the control target value generating circuit 21 is suppressed and panning control is engaged.

Further, if a correction amount on the Y axis side (referred to as "Y correction amount", hereinafter) increases due to camera shake from the correction amount c on the P axis side (referred to as "P correction amount", hereinafter) as shown by arrow 221, as shown in line 42 in FIG. 4 before the Y correction amount reaches a the cutoff frequency of HPF_Y 24 starts to rise. By restricting the pass-through frequencies on the Y axis side in this way, panning-time control can be instituted by suppressing any increase in the Y correction amount obtained from the control target value generating circuit 21. Then, at Y correction amount c', by taking a maximum value fc_max that does not permit any of the frequencies of the camera shake applied to the camera to pass as the cutoff frequency of the HPF_Y 24, control can be obtained that does not exceed the correction amount c'.

In addition, for example, in a case in which the Y correction amount increases from the state of the P correction amount b shown in FIG. 3B during camera shake correction, the cutoff frequency is changed as shown in line 43 in FIG. 4. In this way, as the P correction amount increases, the cutoff frequency starts to increase from a stage at which the Y correction amount is still small while at the same time the proportion of change shows an even sharper characteristic change. Then, as can be seen from FIG. 3B, once the Y correction amount becomes a, the maximum range 202 is reached at (b, a), and thus the cutoff frequency of HPF_Y 24 assumes the maximum value fc_max.

Thus, as described above, the cutoff frequency of the high pass filters is continuously changed depending on the correction amount as shown by lines 41-43 in FIG. 4. By so doing, the camera shake correction amount is gradually decreased from the low frequency side, enabling camera shake correction to be stopped without the correction amount exceeding the correction control range 201.

It should be noted that, for convenience, in FIG. 3A and FIG. 3B a description was given of the first quadrant of the movable range configured by the correction axis Y and the correction axis P (in which the correction amounts of both Y and P were positive). However, the same operations are carried out in the other quadrants.

In addition, in the example shown in FIG. 3A and FIG. 3B described above, a and b have the same value on both the Y axis side and the P axis side. However, these values can be different on the Y axis side and the P axis side.

Figure 5:
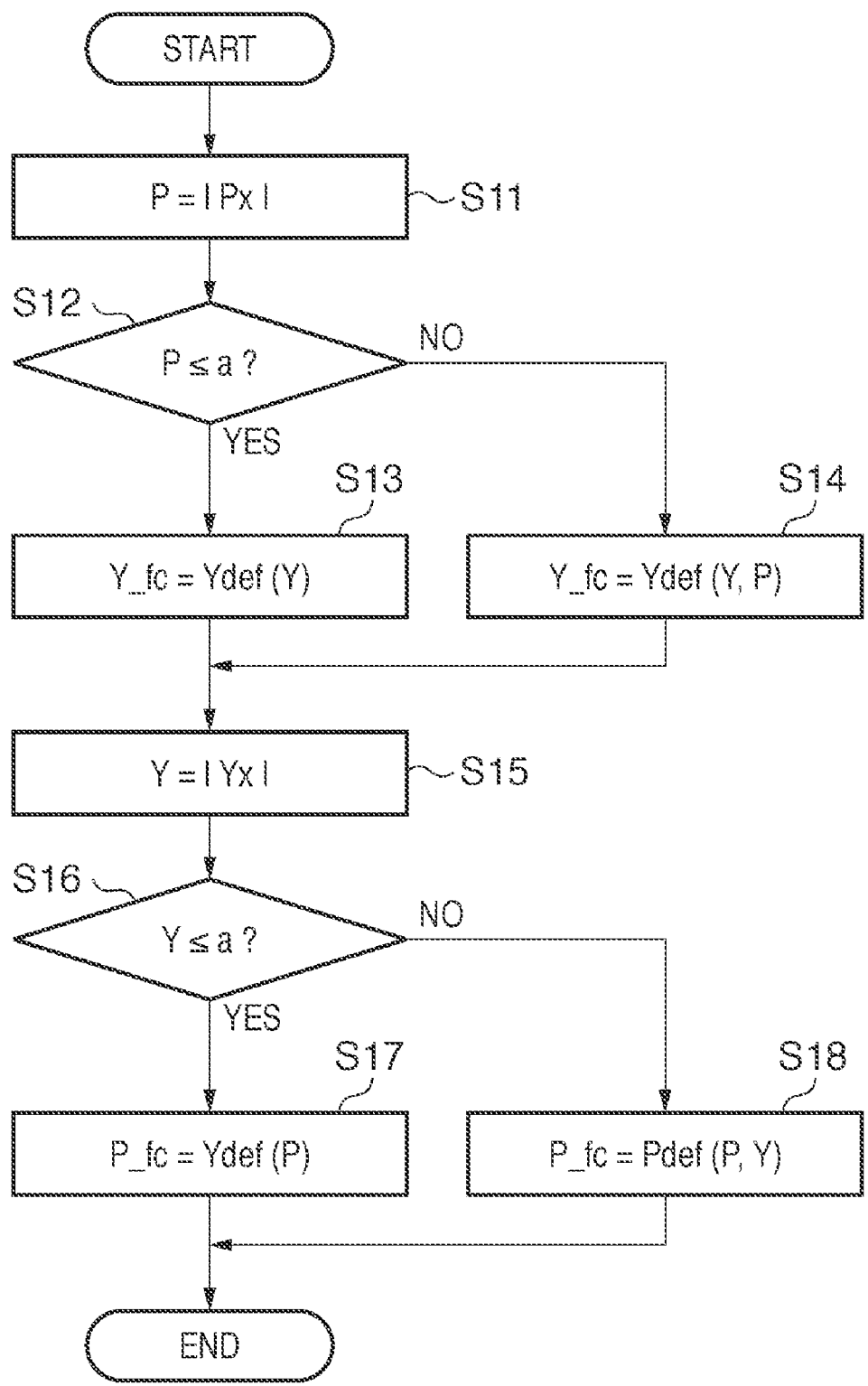
FIG. 5 is a flowchart illustrating operation of a pan/tilt determination circuit according to the embodiment of the present invention.

Next, a description is given of control performed by the pan/tilt determination circuit 30 described above, with reference to the flowchart shown in FIG. 5. The process shown in FIG. 5 represents control that is carried out repeatedly at a repetition frequency that is higher than the camera shake frequency of the camera, and is executed repeatedly in, for example, cycles of 100 Hz.

When control is commenced, first, the absolute value P of P correction amount (or displacement) Px of the correction optical system 2 is calculated (step S11), and it is determined whether or not the absolute value P is at or below a threshold value indicated by the a described above (step S12). If the absolute value P is at or below the threshold value a, processing proceeds to step S13, and if it exceeds the threshold value a then processing proceeds to step S14.

At step S13, a cutoff frequency Y_fc of HPF_Y 24 is calculated for when the absolute value P is equal to or less than the threshold value a. In a case in which the absolute value P is equal to or less than the threshold value a, then, as described with reference to FIG. 4, the change in the cutoff frequency is a function of the Y correction amount indicated by line 41 and shown by the following equation.

$Y\_fc = Y\text{def}(Y)$

On the other hand, in step S14 a cutoff frequency Y_fc of HPF_Y 24 is calculated for a case in which the absolute value P exceeds the threshold value a. The change in the cutoff frequency in a case in which the absolute value P exceeds the threshold value a is a function of the Y and P correction amounts indicated within a region 44 of a to b that includes lines 42 and 43 in FIG. 4 and shown by the flowing equation.

$Y\_fc = Y\text{def}(Y,P)$

Next, processing on the Y axis side is carried out. The absolute value Y of Y correction amount (or displacement) Yx of the correction optical system 2 is calculated (step S15), and it is determined whether or not the absolute value Y is equal to or less than the threshold value indicated by a described above (step S16). If the absolute value Y is at or below the threshold value a, processing proceeds to step S17, and if it exceeds the threshold value a then processing proceeds to step S18.

In step S17, a cutoff frequency P_fc of HPF_P 25 for when the absolute value Y is at or below the threshold value a is calculated. If the absolute value Y is at or below the threshold value a, then similarly to the equation as described above it is shown by the flowing equation.

$P\_fc = P\text{def}(P)$

On the other hand, in step S18 a cutoff frequency P_fc of HPF_Y 24 is calculated for a case in which the absolute value Y exceeds the threshold value a. The change in the cutoff frequency in a case in which the absolute value Y exceeds the threshold value a is a function of the P and Y correction amounts and shown by the following equation.

$P\_fc = Y\text{def}(P,Y)$

Once cutoff frequencies of the HPF_Y 24 and HPF_P 25 are calculated as described above attendant upon the pan/tilt determination process, processing is ended.

By controlling the cutoff frequency with the pan/tilt determination circuit 30 as described above, the stability of images that have been corrected for camera shake can be improved.

It is to be noted that although in the foregoing description a functional equation is used to obtain Y_fc and P_fc, alternatively a look-up table with Y and P correction values as arguments may be used instead.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-167271, filed on Jul. 15, 2009, which is hereby incorporated by reference herein in its entirety.

What is claimed is:

1. An image stabilization apparatus comprising:
   (a) a detection unit that detects camera shake in first and second directions orthogonal to each other;
   (b) a first filter unit and a second filter unit that cut off a low frequency component of an output from the detection unit, wherein cutoff frequencies of the first and second filter units are variable;
   (c) a calculation unit that calculates a correction amount for correcting camera shake in the first direction and a correction amount for correcting camera shake in the second direction based on outputs from the first and second filter units, respectively;
   (d) a control unit that controls the cutoff frequency of the first filter unit based on the first correction amount and the cutoff frequency of the second filter unit based on the second correction amount, wherein the larger the correction amount the higher the control unit sets the cutoff frequency;

(e) a determination unit that determines whether the first and second correction amounts respectively exceed predetermined values set for the first and second correction amounts, respectively; and (f) a correction unit that corrects camera shake based on the correction amounts calculated for the first and second directions by the calculation unit, wherein the control unit controls the cutoff frequency of the second filter unit based on the first correction amount in a case in which it is determined by the determination unit that the first correction amount exceeds the predetermined value set for the first correction amount, and controls the cutoff frequency of the first filter unit based on the second correction amount in a case in which it is determined by the determination unit that the second correction amount exceeds the predetermined value set for the second correction amount.

2. The image stabilization apparatus according to claim 1, wherein the correction unit drives within a circular or octagonal range.

3. An image sensing apparatus comprising the image stabilization apparatus according to claim 1.

4. An image stabilization method comprising the steps of:
(a) detecting camera shake in first and second directions orthogonal to each other;
(b) cutting off a low frequency component of an output indicating a detection result of the detection step using a first filter unit and a second filter unit, wherein cutoff frequencies of the first and second filter units are variable;
(c) calculating a correction amount for correcting camera shake in the first direction and a correction amount for correcting camera shake in the second direction based on outputs from the first and second filter units, respectively;
(d) controlling the cutoff frequency of the first filter unit based on the first correction amount and the cutoff frequency of the second filter unit based on the second correction amount, wherein the larger the correction amount the higher the cutoff frequency;
(e) determining whether the first and second correction amounts respectively exceed predetermined values set for the first and second correction amounts, respectively; and
(f) correcting camera shake based on the correction amounts calculated for the first and second directions by the calculation unit, wherein the controlling step controls the cutoff frequency of the second filter unit based on the first correction amount in a case in which it is determined in the determination step that the first correction amount exceeds the predetermined value set for the first correction amount, and controls the cutoff frequency of the first filter unit based on the second correction amount in a case in which it is determined in the determination step that the second correction amount exceeds the predetermined value set for the second correction amount.

* * * * *